March 16, 1954 F. H. CARY 2,672,600
TELEMETRIC APPARATUS
Filed Dec. 13, 1951
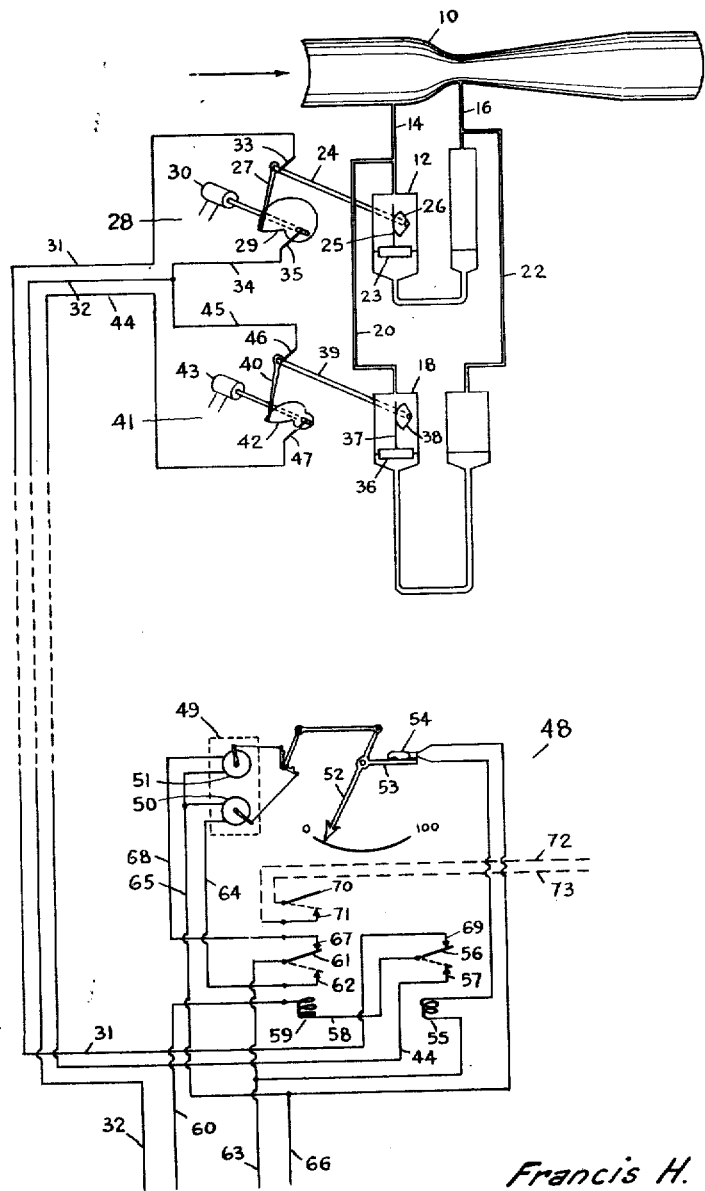
Francis H. Cary
INVENTOR.
BY E.C. Sanborn
Attorney Patented Mar. 16, 1954

2,672,600

UNITED STATES PATENT OFFICE 2,672,600

TELEMETRIC APPARATUS

Francis H. Cary, Warwick, R. I., assignor to B-I-F Industries, Inc., a corporation of Rhode Island Application December 13, 1951, Serial No. 261,501

7 Claims. (Cl. 340—206)

This invention relates to telemetering, and more especially to the obtaining of desirable signal accuracy throughout the entire range of variation of the magnitudes under measurement. The invention is particularly concerned with telemetering systems of the "impulse-duration" type wherein there is customarily employed a transmitter having a cam rotatable continuously at substantially constant speed and co-operating with contact means for sending in each of successive cycles of rotation of the cam an electrical impulse of a duration corresponding to a variable magnitude, such as rate of flow, temperature, or pressure.

A limitation of prior apparatus of this type is that accuracy of signal length is difficult to obtain at low rates where the curvature of the cam approaches the arc of a circle and the angle between the cam edge and the rate arm therefore approaches zero. This is especially true in the telemetric transmitters used in connection with the measurement of flow where the cam is shaped so as to produce a signal proportional to the square-root of the rate arm displacement.

To produce accurate signals in the low, as well as the higher, range of rates, the present invention provides two transmitters, one of which is of conventional type and the other of which has a specially designed cam which spreads out the low rate range so that accurate signaling in this range is effected.

The two transmitters are connected in parallel to one receiver; and transmitter-selecting means are provided whereby the low rate transmitter is effective for operating the receiver at low rates only, and the high rate transmitter at high rates only. The rate at any time determines which transmitter is effective. A further, more specific, feature of the invention comprises means governed by the receiver for switching the latter from one to the other of the transmitters, in response to the rate indicated at the receiver.

Other features and advantages of the invention will be hereinafter described and claimed.

In the accompanying drawings there is shown a telemetric system arranged in accordance with my invention and illustrating the features thereof.

In the drawing, 10 indicates a Venturi tube or other differential pressure producer to which a high differential manometer 12 is connected by pressure pipes 14 and 16. A low differential manometer 18 is connected in parallel with manometer 12 by means of pressure pipes 20 and 22.

The manometers 12 and 18 contain mercury or other suitable liquid which, in well-known manner, is displaced from one well of the manometer to the other well in response to changes in the differential pressure created in the Venturi tube.

In the manometer 12, there is a float 23 resting on the mercury surface. Motion of the float is transmitted to the shaft 24 by means such as a rack 25 and gear segment 26.

Attached to shaft 24 is a rate arm 27 of telemetric transmitter 28. Cooperating with rate arm 27 is a cam 29 continuously rotated by synchronous electric motor 30.

It will be seen that the rate arm 27 will assume a position relative to the center of cam 29 dependent upon the displacement of the float in manometer 12. One wire 31 of a telemetric circuit is connected to arm 27 by means of a brush 33, and another wire 32 of the telemetric circuit is connected to the shaft of cam 29 by means of wire 34 and brush 35.

It will be seen that the circuit through wires 31 and 32 will be completed in the transmitter 28 during that part of each revolution of cam 29 in which the rate arm 27 rides on the cam 29. The cam 29 is so shaped that the duration of the telemetric signal in each cycle is proportional to the position of rate arm 27 relative to the center of cam 29, and therefore to the position of float 23, and therefore to the rate of flow through the Venturi tube 10.

The manometer 18 contains a float 36, a rack 37 and a gear segment 38 connected to shaft 39 to position rate arm 40 of telemetric transmitter 41 in the same manner as described for transmitter 28.

Manometer 18 is of well-known type in which full float travel occurs upon relatively low differential pressure from Venturi tube 10, and manometer 12 is of well-known type in which full float travel occurs upon relatively high differential pressure from Venturi tube 10. As a result of this combination the rate arm 40 of telemetric transmitter 41 moves over its full range during the low differential range, whereas rate arm 27 of telemetric transmitter 28 moves over its full range during the high differential range.

Cam 42 of transmitter 41 is continuously rotated by synchronous motor 43 and cooperates with rate arm 40 to complete a telemetric circuit from wire 32 to wire 44 by means of wire 45 and brush 46, rate arm 40, cam 42, and brush 47.

The cam 42 is so shaped that the duration of the telemetric signal in each cycle is proportional to the position of rate arm 40 relative to the center of cam 42, and therefore to the position of float 36. Thus, the duration of each of said signals is proportional to the rate of flow through Venturi tube 10 within the range of the relatively low rates of flow corresponding to the travel of said float. Said cam is so shaped that for each increment of change of float position within said range, a substantial change of signal duration is effected through the engagement of said cam and the rate arm 40.

When the flow rates in Venturi tube 10 exceed the low range, the manometric liquid in manometer 18 merely is displaced downward out of the float chamber without causing further movement of the float. For this purpose, downward movement of the float may be limited by engagement of the float with inwardly converging walls of the manometer chamber, or with any other suitable stop positioned below said float.

The telemetric receiver generally indicated by the numeral 48 comprises a clutch unit 49 of well-known design, having a member 50 which moves in each cycle during the time that the telemetric signal is on, and a member 51 which moves in each cycle during the time that the telemetric signal is off. The indicating pointer 52 is positioned alternately by the clutch members 50 and 51 by suitable linkages to indicate the rate of flow. An example of a suitable type of receiver which may be employed is illustrated in the Huxford Patent No. 2,145,026, issued January 24, 1939.

The pointer 52 is provided with an arm 53 on which is mounted a tilting switch 54 of well-known type in which a circuit is made or broken by the movement of a globule of mercury.

When the pointer 52 is positioned within the range of low flow rates, the switch 54 is closed, completing a circuit through the relay coil 54 by way of wire 66, connected to one terminal of a source of electromotive force, switch 54, coil 54, and wire 63 connected to the opposite terminal of said source. The armature 56 of said coil 55 is thereby caused to engage a contact 57, establishing a connection from wire 60 (connected to one terminal of a source of electromotive force) through coil 59, wire 58, and contact 57 to the previously mentioned wire 44 which extends to the cam 42 of the low-rate transmitter 41. Then, whenever the rate arm 40 engages said cam 42, the wire 44 and coil 59 will be connected to the wire 32 (which in turn is connected to the opposite terminal of the source of electromotive force to which wire 60 is connected); whereupon said coil 59 is energized and its armature 61 is engaged with a contact 62. A circuit is thus completed from wire 63 through armature 61, contact 62, wire 64, clutch member 50, wire 65 and back to wire 66, whereby said clutch unit is energized.

When the telemetric circuit through wires 44 and 32 is broken in transmitter 41 by the disengagement of arm 40 from cam 42 during the rotation of said cam; the coil 59 is deenergized and its armature 61 returns into engagement with a contact 67. Thereby the circuit through clutch unit 50 is deenergized and a circuit is completed from wire 68 through said armature, contact 67, wire 68, clutch unit 51, wire 65, and back to wire 66. Clutch unit 51 is thus energized until the cam 42 again engages the rate arm 40, assuming the switch 54 to remain closed.

When the indicated rate of flow rises above the aforementioned lower range, i. e., when the pointer 52 arrives in the position corresponding to the maximum value received from transmitter 41, the arm 53 will be positioned so that the switch 54 will open the circuit to coil 55, in which case the armature 56 will move to contact 69, thereby completing a connection from wire 31 through contact 69, armature 56, and wire 58, to coil 59. Under these conditions, it will be apparent that the transmitter 28 will operate the relay coil 59 and the clutch members 50 and 51 in response to signals from rate arm 27 and cam 29, so that said pointer 52 will indicate values in the higher range for which transmitter 28 is provided.

If the receiver 48 must be located at a considerable distance from the transmitters 28 and 41, it may be undesirable to have three wires in the telemetric transmission line. The number of wires can be reduced by locating the receiver 48 near the transmitters 28 and 41 and providing in the receiver 48 an extra armature 70 and contact 71 operated by the coil 59. Wires 72 and 73 connected respectively to the armature 70 and the contact 71 then comprise a two-wire telemetric circuit for operation of a conventional receiver located remotely.

While the foregoing description has been confined to the telemetering of flow rates which inherently involve a square-root relation between rate of flow and differential pressure in which the features of the dual transmitters are particularly advantageous, it will be understood that the principle of my invention may be applied to the transmission of linear or other functions to obtain greater accuracy in the low rate range.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a telemetering system, a plurality of transmitters, one for sending cyclical impulses of durations corresponding to values of a variable within a predetermined low range and the other for sending cyclical impulses of durations corresponding to values of said variable within a predetermined higher range, a telemetric receiver to which said transmitters are adapted to be connected in parallel, and means controlled by values of said variable for selectively connecting said transmitters to said receiver.

2. In a telemetering system, a plurality of transmitters, one for sending cyclical impulses of durations corresponding to values of a variable within a predetermined low range and the other for sending cyclical impulses of durations corresponding to values of said variable within a predetermined higher range, a telemetric receiver to which said transmitters are adapted to be connected in parallel, and means controlled by said receiver for connecting one of said transmitters to said receiver when said values are in said low range and for connecting the other of said transmitters to said receiver when said values are in said higher range.

3. Telemetric apparatus comprising a transmitter having an element movable in response to low range values of a variable magnitude and a rotatable cam cooperating with said element for sending in a cycle of rotation of said cam an electrical impulse of a duration corresponding to a value of said variable within said low range, a second transmitter having an element movable in response to values of said variable magnitude extending into a range substantially higher than the first-mentioned range and a rotatable cam cooperating with said element for sending in a cycle of rotation of said cam an impulse of a duration corresponding to a value of said variable outside said lower range, and means for rendering the first transmitter effective and the second ineffective when the values of said variable magnitude are in said lower range.

4. Telemetric apparatus comprising a transmitter having an element movable in response to low range values of a variable magnitude and a rotatable cam cooperating with said element for sending in a cycle of rotation of said cam an electrical impulse of a duration corresponding to a value of said variable within said low range, a second transmitter having an element movable in response to values of said variable magnitude extending into a range substantially higher than the first-mentioned range and a rotatable cam cooperating with said element for sending in a cycle of rotation of said cam an impulse of a duration corresponding to a value of said variable outside said lower range, and means for rendering the first transmitter effective and the second ineffective when the values of said variable magnitude are in said lower range, and for rendering the second transmitter effective and the first ineffective in response to a predetermined maximum value of said lower range.

5. Telemetric apparatus comprising a transmitter having an element movable in response to low range values of a variable magnitude and a rotatable cam cooperating with said element for sending in a cycle of rotation of said cam an electrical impulse of a duration corresponding to a value of said variable within said low range, a second transmitter having an element movable in response to values of said variable magnitude extending into a range substantially higher than the first-mentioned range and a rotatable cam cooperating with said element for sending in a cycle of rotation of said cam an impulse of a duration corresponding to a value of said variable outside said lower range, a receiver to which said transmitters are adapted to be connected in parallel, said receiver having an element positionable in accordance with values of said variable magnitude, and switching means controlled by said receiver element for maintaining the first transmitter connected to said receiver when said values are within said range and for disconnecting said first transmitter from said receiver and connecting the second transmitter thereto in response to a predetermined maximum value from said first transmitter.

6. Telemetric apparatus comprising a receiver having an element movable to different positions in response to signals corresponding to values of a variable magnitude, means for connecting said receiver to either of a plurality of telemetric transmitters, and switching means controlled by said element for maintaining said receiver connected to one of said transmitters when said values are in a predetermined low range and for connecting the other of said transmitters to said receiver for values exceeding said range.

7. Telemetric apparatus comprising a receiver having an element movable to different positions throughout a given range in response to signals corresponding to values of a variable magnitude, means for connecting said receiver to either of a plurality of telemetric transmitters, and switching means operable by said element for maintaining said receiver connected to one of said transmitters when said values are in a predetermined low range and for disconnecting said receiver from the last mentioned transmitter and connecting the receiver to the other of said transmitters upon arrival of said element at a given position in its range of movements.

FRANCIS H. CARY.

References Cited in the file of this patent
UNITED STATES PATENTS

| Number | Name | Date |
| --- | --- | --- |
| 1,102,234 | Bliss | July 7, 1914 |
| 2,333,083 | Dueringer | Nov. 2, 1942 |
| 2,443,351 | Green | June 15, 1948 |
| 2,533,091 | Campani | Dec. 5, 1950 |
| 2,536,465 | Reeves | Jan. 2, 1951 |